Sept. 12, 1933.  G. M. BELLANCA  1,926,136
ADJUSTABLE STABILIZING LIFT STRUT
Filed Nov. 8, 1930
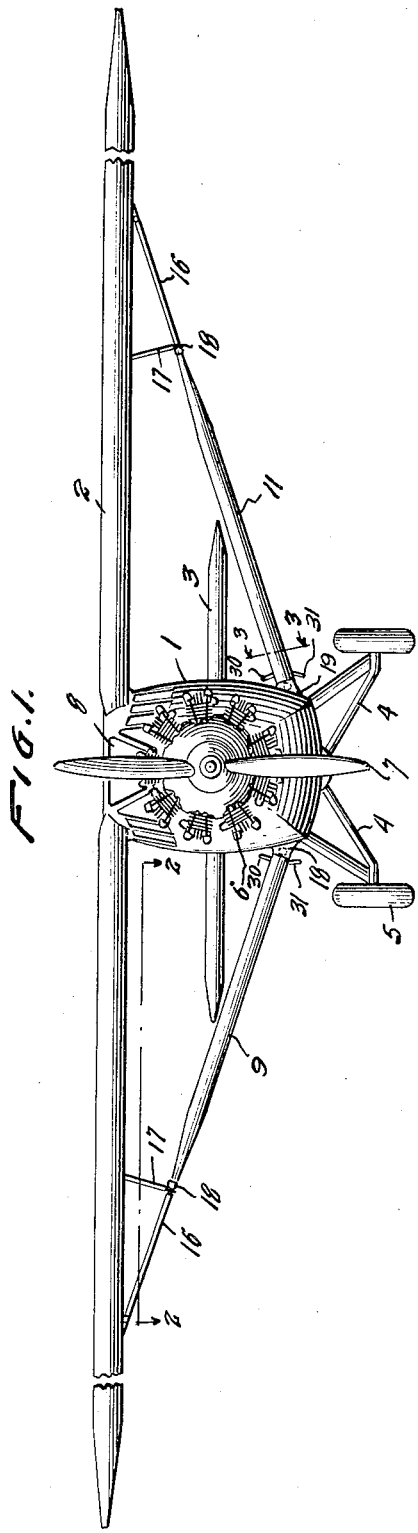
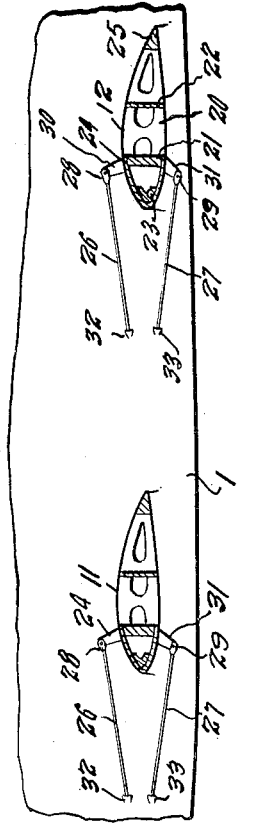
Inventor
GIUSEPPE M. BELLANCA
By Sammes + Sammes
Attorneys Patented Sept. 12, 1933

1,926,136

UNITED STATES PATENT OFFICE 1,926,136

ADJUSTABLE STABILIZING LIFT STRUT

Giuseppe M. Bellanca, New Castle, Del.

Application November 8, 1930. Serial No. 494,365

3 Claims. (Cl. 244—29)

This invention relates in general to aircraft, and more particularly has reference to adjustable stabilizing and lift struts.

The present application is a continuation in part of my prior applications filed the 8th day of November and designated by Serial No. 494,360; filed the 8th day of November, and designated by Serial No. 494,361 respectively. In these applications I have shown an airplane provided with struts to reinforce the mounting of a single wing on the fuselage of an airplane, or to reinforce the mounting between wings, which are adapted to provide for additional lift as well.

As described in my first application, the members employed in the past for bracing between the wing and the fuselage of an airplane, or between wing surfaces, have generally been circular in cross section. In some instances a fairing has been added to produce a streamline section on certain of the larger struts, but so far as I am aware it has never been contemplated to so design struts of this character as to provide for lift in addition to that of the wings when the airplane is in flight.

Thus the former strut constructions have been diametrically opposed to that which I contemplate. Previous to this time it has been sought to reduce parasitic resistance. It has been for this reason that struts have been streamlined, and the dimensions of the same in cross section kept to the minimum. Until the invention disclosed in my first application no advantage has been taken of the lifting effect in addition to that afforded by the wings, which may be obtained in the use of struts constructed as air foils, and the increase in stability which may be obtained by particular positioning of the struts.

The effective lifting surface of airplanes, increased by struts of this character enables a decrease in the landing speed of such an airplane by reason of the added lift afforded. The angular positioning of the chords of the struts laterally with respect to that of the wing also tends to increase the lateral stability of the airplane, while if the struts are spaced in pairs, the longitudinal stability may also be increased.

In my second application I have shown lift struts positioned at different angles of incidence with respect to one another and to the wing, and the top ends mounted on the underside of the wing through a suitable structure skeleton designed to eliminate interference by the struts with air currents passing under the wing. The struts, formed as air foils, shown in my first application if positioned with the chords of the same in the same plane as that of the wing to impart additional lift with a minimum of resistance, and increase lateral and longitudinal stability due to the forces exerted by the same. When the struts are positioned at different angles of incidence, however, as shown in my second application, such positioning is accompanied by a decrease in speed and greater stability in landing and taking off, although speed in flight is necessarily sacrificed to some degree in flight by reason of the opposed forces set up, and greater resistance offered.

It is the purpose of my present invention, to employ the struts on an airplane, with the advantage obtained on landing and taking off residing in fixing the struts at different angles of incidence, and the added speed which results in flight by positioning the chords of the struts on the same plane as that of the wing. I accomplish this desirable combination by mounting the struts for partial rotation so that the position of the chords of the same may be readily adjusted.

The primary object of this invention, therefore, is to provide lift struts for an airplane increasing the lateral and longitudinal stability thereof, and offering a minimum resistance in flight which may be operated to decrease the landing and take-off speed of the airplane.

Another object of this invention is to provide lift struts for reinforcing the mounting of the wing on the fuselage of an airplane which may be positioned to normally offer a minimum of resistance in flight, which may be operated, however, to decrease the landing and take-off speed of the airplane.

A further object of this invention is to provide struts for reinforcing the mounting of the wing on the fuselage of an airplane, designed to increase the lift of the airplane with a minimum of resistance in flight, and capable of adjustment to decrease the landing and take-off speed of the airplane.

A still further object of this invention is to provide lift struts for reinforcing the mounting of a wing on the fuselage of an airplane, positioned to increase the longitudinal and lateral stability thereof, and anchored on the wing without obstructing air currents passing thereunder, capable of operation to decrease the landing and take-off speed of the airplane.

With these and other objects in view, which may be incident to my improvements, the invention consists in the parts and combination to be hereinafter set forth and claimed, with the understanding that the several necessary elements comprising my invention may be varied in construction, proportions and arrangements without departing from the spirit and scope of the appended claims.

This invention consists in general of wing struts constructed and mounted on an airplane in the same manner as the struts disclosed in my copending applications, except that the same are made capable of movement to change the angles of incidence thereof, which adjustment may be carried on in flight. It will be appreciated that the loading of an airplane off the lateral center of balance often tends to make the airplane nose or tail heavy, and thus longitudinally unstable. While the struts are preferably positioned in flight to present minimum resistance surfaces, by positioning the struts so that counteracting forces are exerted thereby, such a change in the lateral center of balance may be compensated for, and longitudinal stability restored. On taking off and landing, the struts are preferably positioned to present surfaces affording a maximum of lift, so that the speed may be decreased, as, as is well known, an increase in the effective area of the wings allow, within certain limits, a decrease in the speed necessary to sustain the airplane.

In order to make my invention more clearly understood, I have shown in the accompanying drawing, means for carrying the same into practical effect without limiting the improvements in their useful applications to the particular constructions, which, for the purpose of explanation, have been made the subject of illustration.

In the drawing:

Figure 1 is a front view of an airplane having the adjustable lift struts.

Figure 2 is a top view taken on line 2—2 of Figure 1.

Figure 3 is a side view partly in section taken on line 3—3 of Figure 1.

Referring more particularly by numerals to the drawing there is shown in Figure 1 a high-wing cabin monoplane having a fuselage 1 and a wing 2 mounted across the top thereof. The rear of the fuselage is provided with a conventional tail assembly of which only the horizontal stabilizer 3 is evident. A landing gear 4, carrying wheels 5, is mounted on the underside of the fuselage in the usual manner, and a radial motor 6, operating a propeller 7, is mounted in the nose of the fuselage, the top of which is provided with a series of windows 8 to allow vision from the interior.

The mounting of the wing 2 on the fuselage is reinforced by pairs of lift struts 9 and 10, and 11 and 12 as shown in Figures 2 and 3, arranged in tandem and parallel. The upper ends of the lift struts are tapered as shown at 13 in Figure 2 and terminate in balls 14 suitably attached to the ends thereof. The balls 14 are designed to engage in sockets 15, provided on the ends of extension members 16 forming a continuation of the struts and suitably anchored at the ends in the underside of the wing 2 forming a skeleton structure which does not interfere with the air currents passing under the wing.

The extensions 16 are held by members 17 formed with eyes 18 on the lower ends, encompassing the extensions 16 adjacent the sockets, and having the top ends likewise secured in the underside of the wing in any suitable manner. The lower ends of the lift struts are provided with balls 18 suitably fixed in the ends thereof and designed to engage in sockets formed in blocks 19, secured to the side walls of the fuselage adjacent the lower edge. Movement of the lift struts is allowed by rotation of the balls carried on the ends thereof, in the sockets in the extension members 16 anchored on the underside of the wing and the blocks 18 attached to the sides of the fuselage.

The struts, as shown in Figure 3, are constructed of transverse ribs 20 and longitudinal front center spars 21, and spacers 22, the front center spar preferably being of greater tensile strength than the rear center spacers. The leading edges of the struts are formed of longitudinal spars 23, covered by caps 24 secured on the edges of the struts are formed of a longitudinal spar 25, secured against the rear ends of the ribs, and terminating substantially in a point, in cross section. The struts may be surfaced with a fabric covering, or enclosed with metal, according to the particular construction of the airplane upon which it is mounted, the same being configured as air foils.

Control of the movement of each of the struts through the balls fixed to the ends thereof partially rotating in the sockets in the blocks fixed to the fuselage, and formed on the extension 16, is effected through cables 26 and 27 terminating in ears 28 and 29 pivoted on arms 30 and 31 fixed on the opposite faces of the struts at the lower ends adjacent the blocks on the fuselage. The cables extend through apertures 32 and 33 provided in the sides of the fuselage, are adapted to be operated by the pilot to effect any desired change in the angle of incidence thereof. Each strut in a pair is preferably capable of being oppositely moved, and the corresponding strut in each pair movable independently of the other, so that the struts may be fixed at the same or different angles of incidence.

The purpose of moving the struts, as hereinbefore mentioned, is primary to increase the effective lifting surface of the airplane on which the struts are mounted in taking off and landing. The struts are also capable of adjustment in flight to restore the longitudinal stability to compensate for a shift in the lateral center of balance if the plane tends to become nose or tail heavy due to excess loading toward the front or rear.

The operation of the struts in the flight of the airplane will be readily understood. On taking off or landing the struts are positioned to afford the maximum lift. In this manner the speed necessary to sustain the plane in the air may be considerably decreased due to the increase in the area of lifting surfaces. The lateral and longitudinal stability of the airplane will also be somewhat increased, however, by the forces exerted on the struts tending to prevent dipping of the wings, or nosing down or up.

The struts are preferably set at angles of incidence adapted to afford the minimum of resistance when the airplane is in full flight. When thus positioned, however, the longitudinal and lateral stability of the airplane is increased due to the forces exerted by the struts, as previously explained in that the same are constructed as air foils.

If the airplane is off the normal lateral center of balance, and hence longitudinally unstable, longitudinal stability may be restored by moving the struts to exert forces tending to counteract for the shift, and thus compensate for the change, allowing normal operation of the usual control surfaces.

There is accomplished by this invention lift struts for airplanes mounted to increase the lateral and longitudinal stability thereof, which may be operated to compensate for shifts in the lateral center of balance of the airplane to longitudinally stabilize the same in flight, the struts being capable of being set at angles of incidence for affording the maximum lift or landing and taking off, to provide for decreasing the speed in increasing the effective area of the lifting surfaces, allowing sustenance of the airplane in the air at lower speeds.

While I have shown and described the preferred embodiment of my invention, I wish it to be understood that I do not confine myself to the precise details of construction herein set forth by way of illustration, as it is apparent that many changes and variations may be made therein, by those skilled in the art without departing from the spirit of the invention, or exceeding the scope of the appended claims.

I claim:

1. In a monoplane pairs of supporting air foils arranged in tandem and parallel, one pair of the airfoils being positioned on one side of the fuselage and the airfoils constituting the pair, on one side, being positioned respectively fore and aft of the center of gravity and anchored to the fuselage and wing, and means to oppositely and reversely change the angle of incidence of each airfoil in each pair thereof to compensate for changes in the lateral center of balance of the monoplane for maintaining the longitudinal stability thereof.

2. In an airplane, a pair of airfoil surfaces attached between the wing and the fuselage on each side of the airplane, one of the airfoils of a pair being positioned forwardly of the center of gravity and the other airfoil of the pair being positioned rearwardly of the center of gravity, and means to oppositely and reversely change the angle of incidence of each of the airfoil surfaces in each pair independently.

3. An airplane comprising a fuselage and an upper main wing, a pair of lift struts attached to the fuselage and to the main wing at each side of the fuselage, one of the lift struts of the pair being positioned forwardly of the center of gravity and the other lift strut being positioned rearwardly of the center of gravity, and means to simultaneously adjust the lift struts to give them a differential angle of incidence to effect rotation of the plane about its lateral axis of rotation.

GIUSEPPE M. BELLANCA.